Figure 1:
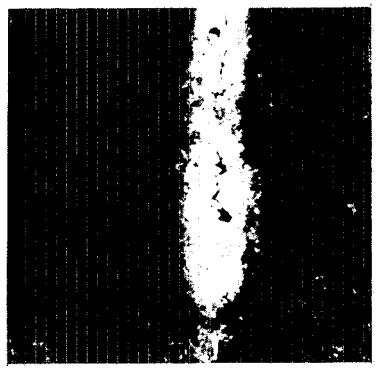

United States Patent [19]

Grabner et al.

[11] 4,175,974

[45] Nov. 27, 1979

[54] SLIDING SHUTTERS OF BASIC REFRACTORY MATERIAL

[75] Inventors: Bernd E. Grabner; Mario G. Heinricher, both of Carinthia, Austria

[73] Assignee: Oesterreichisch-Amerikanische Magnesit Aktiengesellschaft, Carinthia, Austria

[21] Appl. No.: 817,351

[22] Filed: Jul. 19, 1977

Related U.S. Application Data

[63] Continuation of Ser. No. 703,366, Jul. 8, 1976, abandoned.

[30] Foreign Application Priority Data

Jul. 16, 1975 [AT] Austria ............................... 5481/75

[51] Int. Cl.² ...................... C04B 35/04; C04B 35/42
[52] U.S. Cl. ........................................ 106/58; 106/59; 222/600
[58] Field of Search .................... 106/58, 59; 222/600

[56] References Cited

U.S. PATENT DOCUMENTS

| | | | |
|---|---|---|---|
| 3,392,037 | 7/1968 | Neely et al. ............................ 106/58 |
| 3,479,194 | 11/1969 | Davies et al. .......................... 106/58 |
| 3,484,026 | 12/1969 | Zehnder .................................. 222/600 |
| 3,522,063 | 7/1970 | Treffner et al. ....................... 106/58 |
| 3,552,984 | 1/1971 | Martinet et al. ...................... 106/58 |
| 3,676,162 | 7/1972 | Mahler ................................... 106/58 |

*Primary Examiner*—James Poer
*Attorney, Agent, or Firm*—Finnegan, Henderson, Farabow & Garrett

[57] ABSTRACT

Thermal stress-resistant sliding shutters for discharging molten metal from vessels are formed by chemically bonding basic refractory materials having an MgO content of 55–98.5%.

4 Claims, 7 Drawing Figures

SLIDING SHUTTERS OF BASIC REFRACTORY MATERIAL

This is a continuation of application Ser. No. 703,366, filed 7-8-76 now abandoned.

The invention concerns sliding shutters of basic refractory material for vessels, such as ladles, containing molten metal.

Ladles and other intermediate vessels for receiving molten liquid metals (for example, steel) have an opening in their bottom for discharging the molten metal. This opening is frequently closed by a sliding shutter that can be moved parallel to the bottom of the ladle or vessel. These sliding shutters are highly stressed by temperature changes, as well as by erosion and slagging. Numerous refractory materials have therefore been suggested for use in these shutters. All presently known sliding shutters are made, however, of burnt, refractory molded bodies, because in the past, it has been assumed that only high grade burnt refractory materials of a special composition could meet the stringent operating requirements for sliding shutters.

The present invention is based on the surprising finding that sliding shutters of certain unburnt refractory materials are superior in resistance to thermal shock (induced by a torch test) to the presently used sliding shutters which are made of burnt refractory materials. The invention provides sliding shutters of basic refractory materials for vessels containing molten metal, which are characterized in that they consist essentially of a chemically bonded basic material of magnesia or magnesite-chromium with MgO contents of 55 to 98.5%. The MgO content should preferably be 75 to 98.5%. In a preferred embodiment, the sliding shutters, if their MgO content is over 75%, contain a phosphate binder. The term "phosphate binder" should be understood to include the use of polymeric phosphates. With MgO contents under 75%, chromic binders such as chromic acid or chromic phosphates are preferred.

It has also been found that basic refractory, chemically bonded materials of magnesia or mixtures of magnesia and chromite with MgO contents of 55 to 98.5%, preferably 65 to 98.5%, and chromates and/or phosphates as binders, are particularly suitable for repairing such sliding shutters.

The term "sliding shutter" comprises in this connection not only a sliding shutter as a whole, but also spare parts for the latter.

The sliding shutters of this invention are preferably formed by pressing a size-graded mixture of magnesia or magnesia-chromite in oxide form with water and the binding agent. The size-graded mixture of magnesia or magnesia-chromite can be conveniently obtained by mixing various screened fractions of a sintered magnesite and optionally a sintered chromite that is subsequently crushed or otherwise subjected to size reduction.

The invention will be described more fully on the basis of the following examples. All percentages unless otherwise noted, are percent by weight. The figures mentioned in the examples refer to photomicrographs of sliding shutters that were subjected to a wear test.

EXAMPLE 1

A refractory oxide mixture of 65% sintered magnesia I with a particle size of 0.3 to 1 mm and 35% sintered magnesia of the same composition with a particle size of 0 to 0.2 mm was pressed with 3 kg sodium metaphosphate per 100 kg of the refractory oxide mixture and 2 kg water per 100 kg of the refractory oxide mixture to form sliding wearing plates, and these were dried at a temperature of 180° C. The sintered magnesia I used had the following composition:

| | |
|---|---|
| SiO2 | 0.26% |
| Fe2O3 | 5.44% |
| Al2O3 | 0.21% |
| CaO | 2.5% |
| MgO | 91.59% |

The sliding plates thus obtained were subjected to a so-called "Torch test" (originated by U.S. Steel Research Laboratory), which was specially developed for testing ladle shutters. This torch test was carried out substantially as follows:

A torch, fed with propane at a rate of 142 cc/sec. and with oxygen at a rate of 138 cc/sec., and arranged in a distance of 6.4 mm from the refractory material or sliding shutter to be tested, was moved over the material to be tested at a speed of 1.7 mm/sec. If desired, the flame can be moved repeatedly over the material, but each time over different areas. With the selected ratio of propane to oxygen of about 1:1, the combustion is incomplete and the flame is relatively cool. The sliding plates to be tested are stressed by the action of the flame and, depending on the size of this stress, they are either only eroded superficially, or damaged deep down.

In the torch test, the sliding plates obtained according to the invention are only moderately cracked on their surface by the stress caused by the flame, as can be seen from FIG. 1.

Figure 2:

For comparison, sliding plates of the same composition were fired at 1500° C., and subsequently were also subjected to the torch test in exactly the same manner. In this case, a much stronger surface erosion and complete cracking of the plates was observed (FIG. 2).

This comparison test shows clearly the superiority of the sliding plates according to the invention over burnt sliding plates of the same composition.

EXAMPLE 2

A refractory oxide mixture of 50% sintered magnesia I with a particle size of 0.3 to 1 mm, 20% chromite of 0.3 to 1 mm, and 30% sintered magnesia II of 0 to 0.2 mm, was pressed to sliding shutter plates with 4 kg sodium metaphosphate per 100 kg of the refractory oxide mixture and 2 kg water per 100 kg of the refractory oxide mixture. The plates were dried at 150° C. and then impregnated with anhydrous steel mill tar in the vacuum.

For the production of a part of the sliding plates, chromite I was used, and for the production of the other part of the plates chromite II was used. The composition of the sintered magnesia II and the chromites I and II was as follows:

| | Sintered magnesia II | Chromite I | Chromite II |
|---|---|---|---|
| SiO2 | 0.74% | 0.7% | 2.5% |
| Fe2O3 | 5.54% | 29.3% | 17.7% |
| Al2O3 | 0.24% | 15.3% | 10.27% |
| Cr2O3 | | 46.2% | 54.7% |
| CaO | 3.85% | 0.1% | 0.03% |
| MgO | 89.37% | 8.4% | 14.8% |

-continued

|  | Sintered magnesia II | Chromite I | Chromite II |
|---|---|---|---|
| Mn3O4 | 0.26% | | |

The two sliding plates had the following chemical composition:

|  | With chromite I | With chromite II |
|---|---|---|
| SiO2 | 0.37% | 0.73% |
| Fe2O3 | 7.62% | 5.30% |
| Al2O3 | 3.22% | 2.21% |
| Cr2O3 | 9.29% | 10.99% |
| CaO | 1.12% | 1.11% |
| MgO | 78.38% | 79.66% |

Figure 3:
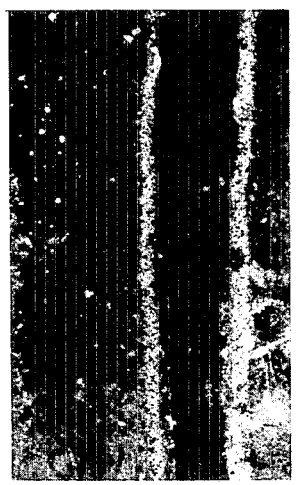
Figure 4:
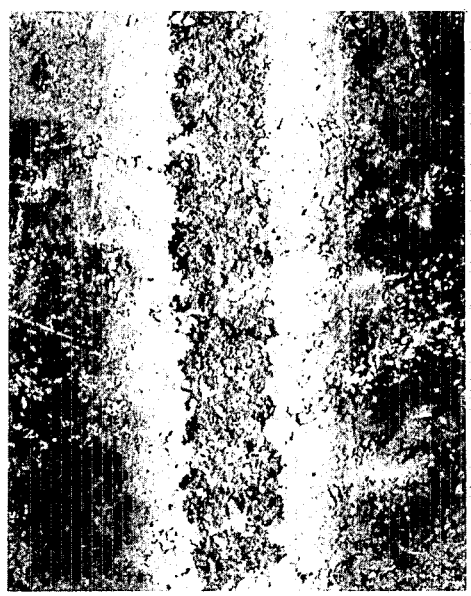

In this case too, the sliding plates according to the invention, which were made of unburnt material, showed much less erosion upon exposure to the above-described torch test (FIG. 3) than sliding plates of exactly the same composition, but which had been burnt at 1000° C. in a reducing or neutral atmosphere (FIG. 4).

EXAMPLE 3

A mixture of 65% of a melt product of the composition indicated below and of a particle size of 0.3 to 1.5 mm, and 35% of the same melt product with a particle size of 0 to 0.2 mm, was formed. The following amounts of additives and binders were added, per 100 kg of the mixture of melt products: 4 kg sodium metaphosphate, 1 kg dry spent sulfite liquor, 1.7 kg chalk, and 1.9 kg water.

The melt product had the following composition:

| SiO2 | 1.64% |
|---|---|
| Fe2O3 | 6.12% |
| Al2O3 | 2.36% |
| Cr2O3 | 11.16% |
| CaO | 2.85% |
| MgO | 75.51% |
| Mn3O4 | 0.36% |

The composite mixture was pressed to sliding plates which were dried at 170° C.

Figure 5:
Figure 6:
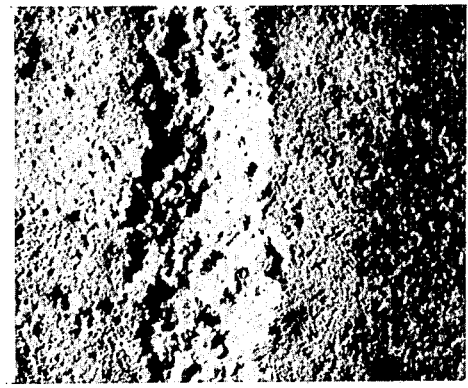

The unburnt sliding plates obtained this way showed only insignificant and practically negligible surface erosion in the torch test (FIG. 5), while sliding plates of exactly the same composition, which had been burnt, however, showed considerable erosion grooves (FIG. 6).

Figure 7:

When the same product was used for the production of sliding plates obtained by melt casting, it was found that these sliding plates broke in the torch test in a short time into several pieces (FIG. 7).

EXAMPLE 4

A mixture of 65% sintered magnesia III of 0.3 to 1 mm and 35% sintered magnesia III of 0 to 0.15 mm was shaped to sliding plates with 4 kg sodium metaphosphate per 100 kg of the mixture, and these plates were dried at a temperature of 150° C. The sintered magnesia III used had the following composition:

| SiO2 | 0.29% |
|---|---|
| Fe2O3 | 0.26% |
| Al2O3 | 0.19% |
| Cr2O3 | 0.10% |
| CaO | 0.69% |
| MgO | 98.47% |

These chemically bonded sliding plates and the sliding plates of the same composition which had been burnt at 1580° C., were subjected to a torch test, where the unburnt plates were only moderately eroded on their surface, while the burnt plates showed great erosion.

EXAMPLE 5

Two repair compounds or materials for sliding plates had the following composition:

| (a) | 70 | parts by weight sintered magnesia I | 0–0.3 mm |
|---|---|---|---|
| | 30 | parts by weight chromite I | 0–0.3 mm |
| | 3 | parts by weight sodium metaphosphate | |
| b) | 94 | parts by weight sintered magnesia III | 0–0.3 mm |
| | 1.5 | parts by weight sintered magnesia III | 0–0.12 mm |
| | 4.5 | parts by weight CrO3 | |

In the case of repair compound (a), it is also possible to use 1 to 4 parts by weight phosphate; in the case of repair compound (b), 3 to 15 parts by weight of the chromate binder can be used, which consists of CrO3 and sintered magnesia in a weight ratio of 3:1. The compounds are mixed with water shortly before use.

The examples show the surprising and unforeseeable behavior of unburnt sliding shutter plates, compared to burnt sliding plates of exactly the same composition that the unburnt plates, despite their much lower original mechanical strength, show a much greater resistance to temperature shock and erosion, which were caused in the torch test by the flame.

What is claimed is:

1. In a combination comprising a vessel for receiving molten metals, said vessel having a discharge opening and a sliding shutter for opening and closing said opening, the improvement comprising:
   said sliding shutter consisting essentially of a chemically bonded, unfired, basic refractory material selected from the group consisting of magnesia and magnesia-chromite mixtures, the basic refractory material having an MgO content of 55 to 98.5%, said sliding shutter having substantially greater resistance to thermal shock when subjected to a torch test than a fired sliding shutter or a sliding shutter made by melt casting of the same composition.

2. A combination according to claim 1 wherein said sliding shutter has an MgO content of 75 to 98.5%.

3. A combination according to claim 1 wherein said sliding shutter contains a phosphate chemical binding agent.

4. A combination according to claim 1 wherein said sliding shutter contains a chemical binder selected from the group consisting of chromic acid and chromic phosphate.

* * * * *